US012636891B2

(12) United States Patent
Negishi et al.

(10) Patent No.: US 12,636,891 B2
(45) Date of Patent: May 26, 2026

(54) INK JET RECORDING METHOD, INK JET RECORDING APPARATUS AND INK STORAGE BAG

(71) Applicant: CANON KABUSHIKI KAISHA, Tokyo (JP)

(72) Inventors: Yuko Negishi, Tokyo (JP); Eiichi Nakata, Kanagawa (JP); Nao Ishijima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 74 days.

(21) Appl. No.: 18/486,435

(22) Filed: Oct. 13, 2023

(65) Prior Publication Data

US 2024/0123738 A1 Apr. 18, 2024

(30) Foreign Application Priority Data

Oct. 18, 2022 (JP) ................................. 2022-167226
Sep. 25, 2023 (JP) ................................. 2023-160080

(51) Int. Cl.
   *B41J 2/175* (2006.01)
   *B41J 2/19* (2006.01)
   (Continued)

(52) U.S. Cl.
   CPC ......... *B41J 2/17563* (2013.01); *C09D 11/104* (2013.01); *C09D 11/12* (2013.01);
   (Continued)

(58) Field of Classification Search
   CPC ..................... B41J 2/17563; B41J 2/19; B41J 2002/17516; C09D 11/104; C09D 11/12; C09D 11/322; C09D 11/38
   See application file for complete search history.

(56) References Cited

U.S. PATENT DOCUMENTS 7,137,693 B2 11/2006 Toyoda et al.
7,615,113 B2 11/2009 Aikawa et al.
(Continued)

FOREIGN PATENT DOCUMENTS

CN 103213417 A 7/2013
CN 108431144 A 8/2018
(Continued)

OTHER PUBLICATIONS

European Search Report issued in corresponding European Application No. 23203137.7 dated Feb. 21, 2024.
(Continued)

*Primary Examiner* — Geoffrey S Mruk

(74) *Attorney, Agent, or Firm* — Venable LLP

(57) ABSTRACT

Provided is an ink jet recording method which can record an image excellent in abrasion resistance and in which an ink after storage is excellent in filter passability. The ink jet recording method includes ejecting an aqueous ink to a recording medium to record an image with an ink jet recording apparatus including: the aqueous ink; an ink storage bag configured to store the aqueous ink; and a recording head of an ink jet system configured to eject the aqueous ink. The recording head includes, in an inside thereof, a filter configured to pass the aqueous ink therethrough. The aqueous ink contains a pigment, a wax, a dispersant for dispersing the wax and a resin particle.

21 Claims, 4 Drawing Sheets

(51) Int. Cl.

| | |
|---|---|
| *C09D 11/104* | (2014.01) |
| *C09D 11/12* | (2006.01) |
| *C09D 11/322* | (2014.01) |
| *C09D 11/38* | (2014.01) |

(52) U.S. Cl.

CPC ............ *C09D 11/322* (2013.01); *C09D 11/38* (2013.01); *B41J 2002/17516* (2013.01); *B41J 2/19* (2013.01)

(56) References Cited

U.S. PATENT DOCUMENTS

| | | | |
|---|---|---|---|
| 8,114,208 | B2 | 2/2012 | Nakata et al. |
| 8,602,546 | B2 | 12/2013 | Shimizu et al. |
| 8,602,547 | B2 | 12/2013 | Nakata et al. |
| 8,834,621 | B2 | 9/2014 | Takebayashi et al. |
| 9,187,662 | B2 | 11/2015 | Yamamoto et al. |
| 9,290,673 | B2 | 3/2016 | Ohmoto |
| 9,598,592 | B2 | 3/2017 | Nakata et al. |
| 9,605,170 | B2 | 3/2017 | Nakagawa et al. |
| 9,956,761 | B2 | 5/2018 | Yamashita et al. |
| 10,022,981 | B2 | 7/2018 | Fujioka et al. |
| 10,125,283 | B2 | 11/2018 | Kojima et al. |
| 10,280,326 | B2 | 5/2019 | Saito et al. |
| 10,654,288 | B2 | 5/2020 | Nakata et al. |
| 11,993,723 | B2 * | 5/2024 | Fernandez Vazquez .................... B41M 1/34 |
| 2004/0080594 | A1 | 4/2004 | Ohira et al. |
| 2004/0183874 | A1 | 9/2004 | Toyoda et al. |
| 2013/0187998 | A1 | 7/2013 | Ohmoto |
| 2023/0077739 | A1 | 3/2023 | Nakata et al. |

FOREIGN PATENT DOCUMENTS

| | | | |
|---|---|---|---|
| EP | 2617780 | A1 | 7/2013 |
| JP | 2004-276991 | A | 10/2004 |
| JP | 2009138021 | A | 6/2009 |
| JP | 5881570 | B2 | 3/2016 |
| JP | 6160028 | B2 | 7/2017 |
| JP | 2019-014256 | A | 1/2019 |

OTHER PUBLICATIONS

Chinese Office Action issued in corresponding Chinese Application No. 202311348030.7 dated Jan. 22, 2026.

\* cited by examiner

INK JET RECORDING METHOD, INK JET RECORDING APPARATUS AND INK STORAGE BAG

BACKGROUND OF THE INVENTION

Field of the Invention

The present invention relates to an ink jet recording method, an ink jet recording apparatus and an ink storage bag.

Description of the Related Art

In recent years, an ink jet recording method has been increasingly used in the field of signs & displays, such as recording of a poster or a large-size advertisement. In this field, an ink jet recording apparatus to be used is characterized by, for example, a larger recording area than that of an ink jet recording apparatus for household use. In addition, those recorded products are sometimes utilized for outdoor display, such as car wrapping or application to a wall surface, and hence an ink that can record an image excellent in abrasion resistance is required. In addition, in this field, various recording media are used but a polyvinyl chloride (PVC) sheet, a polyethylene terephthalate (PET) sheet or the like is often used in addition to an absorbent recording medium having ink absorbency from the viewpoints of, for example, the strength and cost of the recording medium. Each of those recording media has no or nearly no ink absorbency on the surface thereof and is what is called a non-absorbent recording medium (recording medium having no aqueous ink absorbency) or a low-absorbent recording medium (recording medium having low aqueous ink absorbency). An ink jet recording method that can directly record an image on each of those recording media has been required.

A method including using a solvent-based ink containing an organic solvent as a main component or a curable ink containing a polymerizable monomer has been known as a method of recording an image on the above-mentioned non-absorbent recording medium or low-absorbent recording medium (those media are hereinafter collectively referred to as "non-absorbent recording medium").

However, a volatile organic solvent is used for the solvent-based ink and hence a large amount of a volatile organic compound (VOC) occurs. In addition, a polymerizable monomer is used for the solvent-based ink and hence heating or UV irradiation is required at the time of the fixation. Accordingly, the recording method including using the solvent-based ink or the curable ink has many problems from the viewpoints of environmental load and safety. Further, in each of the recorded products obtained by those recording methods, a decomposed product of the organic solvent, the polymerizable monomer or the like remains inside an image and hence odor may be a serious problem depending on a usage environment of the recorded product such as the case in which the recorded product is displayed inside a room.

For such reasons, there has been a growing need for a recording method that can record an image on the non-absorbent recording medium in addition to the absorbent recording medium through use of an aqueous ink. In recent years, the number of opportunities to use a container in a bag form that causes a small amount of waste as an ink tank has been increasing from the viewpoint of ecology. Further, for a long-term use, a deaerated ink having an inert gas dissolved therein has been used from the viewpoints of the introduction property and ejection property of the ink (Japanese Patent Application Laid-Open No. 2004-276991). In addition, in a case that cannot be handled only by the deaerated ink, there has been proposed a method including using a specific filter in a flow path (Japanese Patent Application Laid-Open No. 2019-014256).

SUMMARY OF THE INVENTION

However, it can be said that the dissolution of the inert gas or the limitation of the kind of the filter as described in Japanese Patent Application Laid-Open No. 2004-276991 and Japanese Patent Application Laid-Open No. 2019-014256 has a disadvantage in terms of a manufacturing process and cost. Further, it has been revealed that it is difficult for the above-mentioned method to achieve both of the abrasion resistance of an image and the filter passability of the ink after storage.

Accordingly, an object of the present invention is to provide an ink jet recording method that is capable of recording images with excellent abrasion resistance and excellent filter passability of ink after storage. In addition, another object of the present invention is to provide an ink jet recording apparatus and an ink storage bag to be used in the ink jet recording method.

That is, according to the present invention, there is provided an ink jet recording method comprising ejecting an aqueous ink to a recording medium to record an image with an ink jet recording apparatus comprising: the aqueous ink; an ink storage bag configured to store the aqueous ink; and a recording head of an ink jet system configured to eject the aqueous ink, wherein the recording head comprises, in an inside thereof, a filter configured to pass the aqueous ink therethrough, wherein the aqueous ink contains a pigment, a wax, a dispersant for dispersing the wax and a resin particle, wherein the aqueous ink has a dissolved oxygen amount (mg/L) of 3.0 mg/L or less, and wherein a total content (% by mass) of the wax and the dispersant for dispersing the wax in the aqueous ink is 0.8% by mass or more to 5.0% by mass or less with respect to a total mass of the ink.

Further features of the present invention will become apparent from the following description of exemplary embodiments with reference to the attached drawings.

DESCRIPTION OF THE EMBODIMENTS

Figure 1:
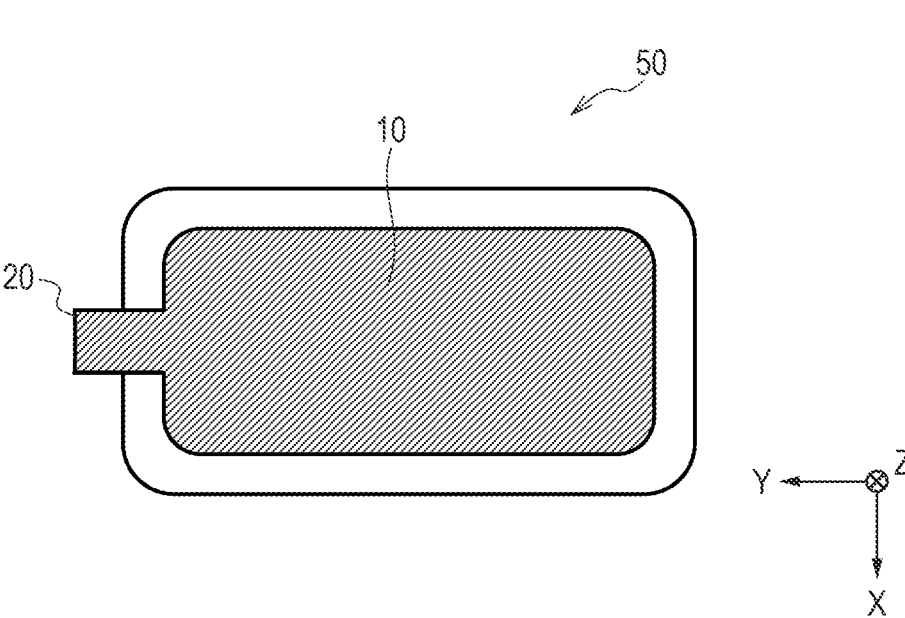
FIG. 1 is a schematic view of an ink storage bag according to one embodiment of the present invention when viewed from above.

The present invention is described in more detail below by way of exemplary embodiments. In the present invention, when a compound is a salt, the salt is present as dissociated ions in an ink, but the expression "contain a salt" is used for convenience. In addition, an aqueous ink and reaction liquid for ink jet are sometimes referred to simply as "ink" and "reaction liquid". Physical property values are values at room temperature (25° C.), unless otherwise stated. The descriptions "(meth)acrylic acid" and "(meth)acrylate" refer to "acrylic acid or methacrylic acid" and "acrylate or methacrylate", respectively. In the present invention, "unit" constituting a resin refers to a repeating unit derived from one monomer.

As described above, an ink to be used in the field of signs & displays is required to be an ink that can record an image excellent in abrasion resistance. As a result of an investigation made by the inventors, the required abrasion resistance of the image can be achieved by incorporating a wax into an aqueous ink.

In addition, as described above, in recent years, an ink tank in a bag form has been preferred to a cartridge form from the viewpoint of environmental protection. As a result of an investigation made by the inventors, it has been revealed that, in long-term storage of an ink in an ink storage bag, dissolved air dissolved in the ink concentrates in an upper portion during the storage, resulting in formation of air bubbles.

From the viewpoint of the abrasion resistance of the image, the wax in the aqueous ink is preferably designed so that the wax is present on a surface of the image to be recorded. Such wax has features of, for example, having high hydrophobicity and being liable to concentrate around the air bubbles in long-term storage. The wax in the vicinity of the air bubbles is concentrated by moisture evaporation from the surface to become unstable and be liable to form an aggregate. With the aggregate described above, the filter passability of a filter arranged inside a recording head is not obtained.

In view of this, the inventors have found that, as a result of an investigation made by the inventors, concentration of air can be suppressed and formation of the air bubbles can be suppressed also in the ink in long-term storage by using a deaerated ink, specifically, an ink having a dissolved oxygen amount of 3.0 mg/L or less. It is conceived that an ink having satisfactory filter passability can be thus provided while aggregation of the wax is prevented and the abrasion resistance of the image is maintained. When the dissolved oxygen amount is more than 3.0 mg/L, as described above, air dissolved in the ink concentrates to form the air bubbles when the ink is subjected to long-term storage. As a result, satisfactory filter passability is not obtained. The total content (% by mass) of the wax and the dispersant for dispersing the wax in the ink is set to 0.8% by mass or more to 5.0% by mass or less with respect to the total mass of the ink. When the total content of the wax and the dispersant for dispersing the wax is less than 0.8% by mass, required abrasion resistance cannot be achieved, and when the total content of the wax and the dispersant for dispersing the wax is more than 5.0% by mass, the wax is liable to aggregate and satisfactory filter passability is not obtained.

<Ink Jet Recording Method, Ink Jet Recording Apparatus and Ink Storage Bag>

An ink jet recording method (hereinafter simply referred to as "recording method") of the present invention is a method including ejecting an aqueous ink to a recording medium to record an image with an ink jet recording apparatus including: the aqueous ink; an ink storage bag configured to store the ink; and a recording head of an ink jet system configured to eject the ink. The recording head includes, in an inside thereof, a filter configured to pass the ink therethrough. The ink to be used in this method contains a pigment, a wax, a dispersant for dispersing the wax and a resin particle. The ink has a dissolved oxygen amount (mg/L) of 3.0 mg/L or less, and a total content (% by mass) of the wax and the dispersant for dispersing the wax in the ink is 0.8% by mass or more to 5.0% by mass or less with respect to a total mass of the ink.

An ink jet recording apparatus (hereinafter simply referred to as "recording apparatus") of the present invention is an apparatus to be used in an ink jet recording method including ejecting an aqueous ink from a recording head of an ink jet system through action of thermal energy and applying the aqueous ink to a recording medium to record an image, and is an apparatus that is preferably used in the recording method described above. In the recording method and the recording apparatus of the present invention, it is not necessary to cure the image through the application of, for example, an active energy ray.

(Ink Storage Bag)

An ink storage bag of the present invention is an ink tank in a bag shape configured to store the above-mentioned aqueous ink for ink jet. FIG. 1 is a schematic view for illustrating an ink storage bag according to one embodiment of the present invention. An ink storage bag 50 illustrated in FIG. 1 includes an ink 10 stored inside. The ink 10 stored in the ink storage bag 50 flows out to the outside through an ink supply port 20 and is supplied to the recording head of the ink jet recording apparatus that communicates to the ink supply port 20. In addition, the arrows X, Y and Z indicating three directions perpendicular to each other are illustrated in FIG. 1. The directions indicated by the arrow X, Y and Z each correspond to an arrangement posture of the ink jet recording apparatus in the state of normal use. The state of normal use of the ink jet recording apparatus is a state in which the ink jet recording apparatus is arranged on a horizontal plane and used.

Figure 2:
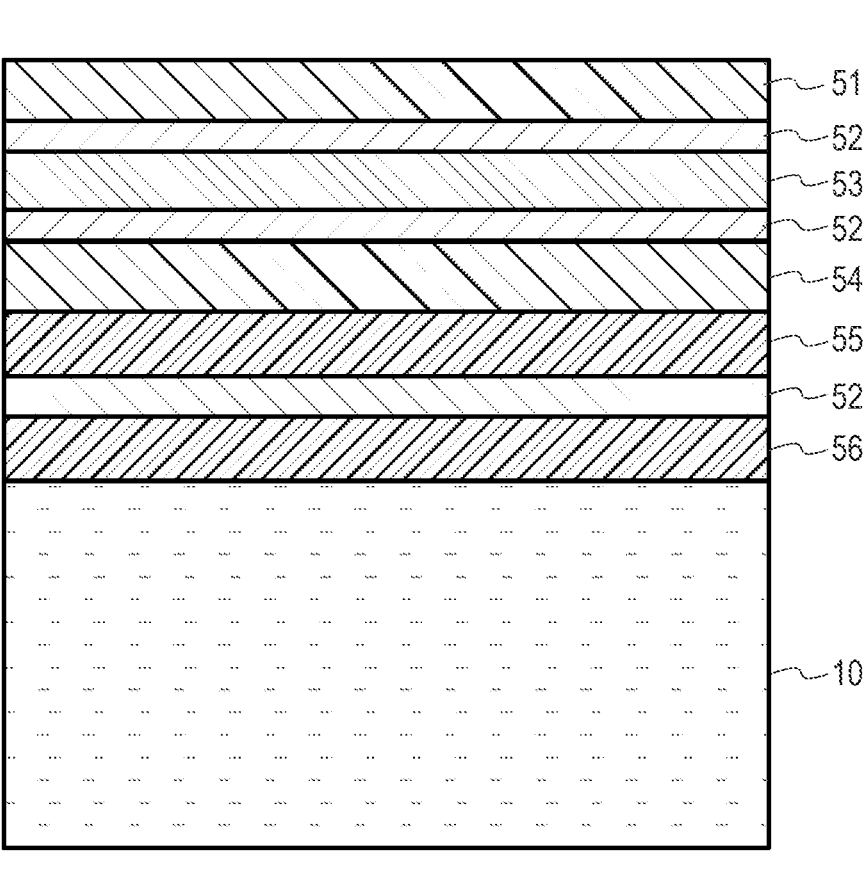
FIG. 2 is an enlarged schematic view of a cross-section of a layer configuration of the ink storage bag according to one embodiment of the present invention.

FIG. 2 is an enlarged schematic view of a cross-section of a layer configuration of the ink storage bag 50 according to one embodiment. As illustrated in FIG. 2, the ink storage bag 50 preferably includes a plurality of layers. In this case, the ink storage bag 50 preferably includes a metal layer 53 in the layer configuration thereof. When the ink storage bag 50 includes the metal layer 53, moisture permeation can be suppressed, formation of an aggregate due to concentration of the wax can be suppressed and storage stability of the ink 10 can be improved. In addition, the metal layer 53 is strong against impact and hence has a suppressing effect on breakage by impact at the time of dropping. The metal layer 53 is more preferably arranged as an inner layer present inside with respect to an outermost layer in the layer configuration of the ink storage bag 50. The metal layer 53 is preferably a layer formed by metal deposition (metal deposited layer).

In addition, in the ink storage bag 50, a layer that is brought into contact with the ink 10 in the layer configuration is preferably formed of a polyethylene resin. In other words, the ink storage bag 50 preferably includes a polyethylene (PE) layer 56 formed of a polyethylene resin. The layer for forming the surface of the ink storage bag 50 in contact with the ink 10 is hereinafter sometimes referred to as "innermost layer". In the layer configuration of the ink storage bag 50, when the innermost layer for forming the surface of the ink storage bag 50 in contact with the ink 10 is the polyethylene layer 56, the polyethylene layer 56 easily becomes wet because the layer easily conforms to the wax in the ink 10. When the polyethylene layer 56 easily becomes wet, an air layer, in other words, the air bubbles are less liable to be formed and hence drying of the wax can be suppressed. The ink storage bag 50 may include, in the layer configuration, in addition to the metal layer 53 and the polyethylene layer 56 serving as the innermost layer, for example, polyethylene terephthalate (PET) layers 51 and 54, a nylon layer 55 and an adhesion layer 52.

The ink storage bag 50 preferably has a flat shape with a small thickness. Herein, the shape being "flat" means that a width of the ink storage bag 50 in a Z direction is smaller than a width thereof in an X direction and a width thereof in a Y direction. The "width" means a distance in each direction between portions positioned on the outermost side of the ink storage bag 50 in the direction. In the ink storage bag 50 having such shape, even when the air layer is generated inside the ink storage bag 50, its height is reduced. Accordingly, an upper portion of the bag easily becomes wet and hence the air bubbles are less liable to be formed. The term "flat shape" may be replaced with the term "flattened shape". Even when the ink storage bag 50 having a flat shape is adopted, the height of the air layer may be increased depending on an arrangement posture of the ink storage bag 50. Accordingly, the bag is preferably arranged so that the Z direction (the direction of the smallest width in a three-dimensional direction) is parallel to a gravity direction.

The ink storage amount of the ink storage bag 50 may be appropriately set in accordance with, for example, a size of the ink jet recording apparatus and frequency of replacement of the ink tank after the ink is used up. The ink storage amount of the ink storage bag is preferably 100 mL or more to 5,000 mL or less, more preferably 500 mL or more to 3,000 mL or less. The size of the ink storage bag may be appropriately set in accordance with, for example, the size of the ink jet recording apparatus or the ink storage amount.

Figure 3:
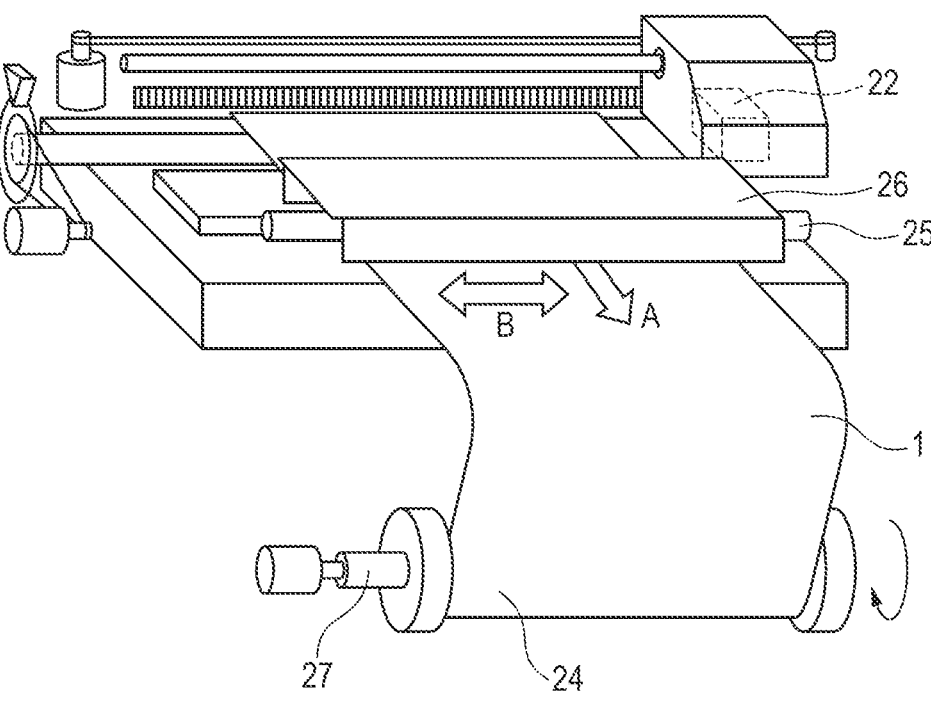
FIG. 3 is a perspective view for schematically illustrating an ink jet recording apparatus according to one embodiment of the present invention.
Figure 4:
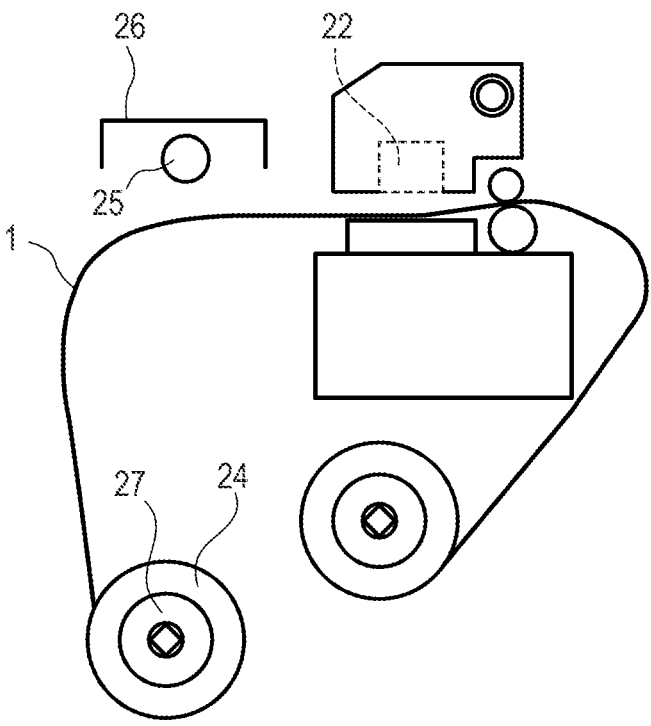
FIG. 4 is a side view for schematically illustrating the ink jet recording apparatus according to one embodiment of the present invention.

FIG. 3 is a perspective view for schematically illustrating an ink jet recording apparatus according to one embodiment of the present invention. In addition, FIG. 4 is a side view for schematically illustrating the ink jet recording apparatus according to one embodiment of the present invention. As illustrated in FIG. 3 and FIG. 4, the recording apparatus according to this embodiment includes a recording head 22 of an ink jet system configured to eject an ink. The recording head 22 is a recording head configured to eject an ink through action of thermal energy. The recording head configured to eject an ink through action of thermal energy ejects an ink from an ejection port by applying an electric pulse to an electrothermal conversion element to apply thermal energy to the ink. In other words, the recording method of the present invention includes an ink applying step of applying the aqueous ink to the recording medium. Herein, the recording head configured to eject an ink through action of thermal energy has been taken as an example but a recording head configured to eject an ink through action of mechanical energy may be adopted. The recording head may have a mechanism by which the aqueous ink to be ejected from the recording head is heated (temperature regulation mechanism). When the recording head has the temperature regulation mechanism, the heating temperature of the ink to be ejected from the recording head is preferably set to 35° C. or more to 70° C. or less. It is preferred that recording with the ink jet recording apparatus be performed at an area of a recording part of 20 m²/h or more from the viewpoint of high productivity. Specifically, there are given, for example, a method including increasing the scanning speed of a carriage and a method including increasing the number of the ejection orifices of the recording head.

A filter configured to pass the ink therethrough is arranged inside the recording head. A liquid flow path having an ejection orifice configured to eject the aqueous ink and a liquid supply path that communicates to the liquid flow path are formed inside the recording head. Accordingly, the filter is preferably arranged in at least one of the liquid flow path or the liquid supply path. The filter is more preferably arranged in the liquid flow path out of those flow paths.

[Heating Step]

The recording method of the present invention may include a step of heating the recording medium having the ink applied thereto (heating treatment). When the recording medium having the ink applied thereto is heated, drying can be promoted and the strength of the image can be increased.

As a unit for heating the recording medium, there may be given, for example, heating units including: a known warming unit such as a heater; an air blast unit utilizing an air blast such as a dryer; and a unit that is a combination thereof. Examples of the heating unit may include the above-mentioned warming unit, air blast unit and unit that is a combination thereof. As a method for the heating treatment, there may be given, for example, a method including applying heat from the side (back surface) of the recording medium opposite to its recording surface (surface to which the ink is applied) with a heater or the like, a method including applying warm air or hot air to the recording surface of the recording medium and a method including performing heating from the recording surface or the back surface through use of an infrared heater. In addition, a plurality thereof may be combined.

For the reason that the abrasion resistance of the image can be increased, the heating temperature of the recording medium having the ink and a reaction liquid applied thereto is preferably set to 50° C. or more to 90° C. or less. The heating temperature of the recording medium having the ink applied thereto may be read with a sensor incorporated at a position corresponding to the heating unit of the recording apparatus or may be judged from a relationship between the heat quantity and the temperature of the recording medium determined in advance in accordance with the kinds of the ink and the recording medium.

In the recording apparatus illustrated in FIG. 3 and FIG. 4, a heater 25 supported by a frame (not shown) is arranged at a downstream position in a sub-scanning direction A with respect to a position at which the recording head 22 performs reciprocating scanning in a main scanning direction B. A recording medium 1 having the ink applied thereto can be heated by the heater 25. Specific examples of the heater 25 may include a sheath heater and a halogen heater. The heater 25 is covered by a heater cover 26. The heater cover 26 is a member configured to efficiently apply heat generated from the heater 25 to the recording medium 1. Further, the heater cover 26 is also a member configured to protect the heater 25. The recording medium 1 having applied thereto the ink ejected from the recording head 22 is wound around a winding spool 27 to form a roll-shaped wound medium 24.

(Filter)

The recording head to be used in the recording method of the present invention includes, in an inside thereof, a filter configured to pass the aqueous ink therethrough. As described above, the filter configured to pass the ink therethrough is present in the ink storage bag or in an ink supply flow path from the ink storage bag to the recording head. The kind and shape of the filter are not particularly limited and a known filter may be used. Of those, a filter of a mesh made of stainless steel or a nonwoven fabric made of stainless steel is preferably used. The filter has a pore diameter (μm) of preferably 1 μm or more to 15 μm or less, more preferably 1 μm or more to 10 μm or less.

(Recording Medium)

In each of the recording method and recording apparatus of the present invention, it is preferred that a low-absorbent recording medium or a non-absorbent recording medium (low- to non-absorbent recording medium) be used as the recording medium. The low- to non-absorbent recording medium is a recording medium having a water absorption amount of 0 mL/m$^2$ or more to 10 mL/m$^2$ or less from the start of contact to 30 msec$^{1/2}$ in a Bristow method described in "Test Method for Liquid Absorption Properties of Paper and Paperboard" in JAPAN TAPPI Paper Pulp Test Method No. 51. In the present invention, a recording medium satisfying the above-mentioned condition for the water absorption amount is defined as the "low- to non-absorbent recording medium." A recording medium for ink jet recording having a coating layer (ink-receiving layer) formed of an inorganic particle (e.g., glossy paper or matte paper) and plain paper having no coating layer are each an "absorbent recording medium" in which the water absorption amount is more than 10 mL/m$^2$.

As the low- to non-absorbent recording medium, there may be used: a plastic film; a recording medium in which a plastic film is bonded to the recording surface of a base material; a recording medium in which an organic resin coating layer is arranged on the recording surface of a base material containing cellulose pulp; or the like. Of those, a plastic film is preferred, and a recording medium in which an organic resin coating layer serving as an organic resin layer is arranged on the recording surface of a base material containing cellulose pulp is also preferred.

When the ink to be used in each of the recording method and recording apparatus of the present invention, which is described later, is applied to the non-absorbent recording medium, resin particles are concentrated by volatilization of components, such as water and a water-soluble organic solvent. Consequently, fusion between the concentrated resin particles is promoted and hence the strength of the image to be recorded is improved. As used herein, the term "recording medium" refers not to a transfer member but to a recording medium on which an image serving as a recorded product is to be recorded.

<Ink>

The ink to be used in the recording method of the present invention is an aqueous ink for ink jet containing pigment, wax, dispersant for dispersing the wax and resin particle, as described above. Respective components to be used in the ink and the like are described in detail below.

[Pigment]

The ink contains a pigment. The content (% by mass) of the pigment in the ink is preferably 0.1% by mass or more to 15.0% by mass or less, more preferably 1.0% by mass or more to 10.0% by mass or less with respect to the total mass of the ink.

Specific examples of the pigment may include: inorganic pigments, such as carbon black and titanium oxide; and organic pigments, such as azo, phthalocyanine, quinacridone, isoindolinone, imidazolone, diketopyrrolopyrrole and dioxazine pigments. The pigments may be used alone or in combination thereof.

A resin-dispersed pigment using a resin as a dispersant, a self-dispersible pigment, which has a hydrophilic group bonded to its particle surface, or the like may be used as a dispersion system for the pigment. In addition, a resin-bonded pigment having a resin-containing organic group chemically bonded to its particle surface, a microcapsule pigment, which contains a particle whose surface is covered with, for example, a resin, or the like may be used. Pigments different from each other in dispersion system out of those pigments may be used in combination. Of those, not a resin-bonded pigment or a microcapsule pigment but a resin-dispersed pigment having a resin serving as a dispersant, the resin being caused to physically adsorb to its particle surface, is preferably used.

A dispersant that can disperse the pigment in an aqueous medium through the action of an anionic group is preferably used as a resin dispersant for dispersing the pigment in the aqueous medium. A resin having an anionic group may be used as the resin dispersant and such a resin as described later, in particular, a water-soluble resin is preferably used. The mass ratio of the content (% by mass) of the pigment in the ink to the content (% by mass) of the resin dispersant therein is preferably 0.3 times or more to 10.0 times or less.

A pigment having an anionic group, such as a carboxylic acid group, a sulfonic acid group or a phosphonic acid group, bonded to its particle surface directly or through any other atomic group (—R—) may be used as the self-dispersible pigment. The anionic group may be any one of an acid type or a salt type. When the group is a salt type, the group may be in any one of a state in which part of the group dissociates or a state in which the entirety thereof dissociates. When the anionic group is a salt type, examples of a cation serving as a counterion may include an alkali metal cation, ammonium and an organic ammonium. Specific examples of the other atomic group (—R—) may include: a linear or branched alkylene group having 1 to 12 carbon atoms; an arylene group, such as a phenylene group or a naphthylene group; a carbonyl group; an imino group; an amide group; a sulfonyl group; an ester group; and an ether group. In addition, groups obtained by combining those groups may be adopted.

[Wax]

A wax is incorporated into the ink. The wax in this specification may be a composition blended with a component except the wax or may be the wax itself. The wax is dispersed as a wax particle with a dispersant, such as a surfactant or a water-soluble resin. The waxes may be used alone or in combination thereof.

The wax is an ester of a higher monohydric or dihydric alcohol that is insoluble in water and a fatty acid in a narrow sense. Accordingly, animal-based waxes and plant-based waxes are included in the category of the wax but oils and fats are not included therein. High-melting point fats, mineral-based waxes, petroleum-based waxes and blends and modified products of various waxes are included therein in a broad sense. In the present invention of the recording method, the waxes in a broad sense may each be used without any particular limitation. The waxes in a broad sense may be classified into natural waxes, synthetic waxes, blends thereof (blended waxes) and modified products thereof (modified waxes).

Examples of the natural wax may include: animal-based waxes, such as beeswax, a spermaceti wax and lanolin; plant-based waxes, such as a Japan wax, a carnauba wax, a sugar cane wax, a palm wax, a candelilla wax and a rice wax; mineral-based waxes such as a montan wax; and petroleum-based waxes, such as a paraffin wax, a microcrystalline wax and petrolatum. Examples of the synthetic wax may include hydrocarbon-based waxes, such as a Fischer-Tropsch wax and polyolefin waxes (e.g., polyethylene wax and polypropylene wax). The blended waxes are mixtures of the above-mentioned various waxes. The modified waxes are obtained by subjecting the above-mentioned various waxes to modification treatment, such as oxidation, hydrogenation, alcohol modification, acrylic modification or urethane modification. The above-mentioned waxes may be used alone or in combination thereof. The wax is preferably at least one kind selected from the group consisting of: a microcrystalline wax; a Fischer-Tropsch wax; a polyolefin wax; a paraffin wax; and modified products and blends thereof. Of those, a blend of a plurality of kinds of waxes is more preferred and a blend of a petroleum-based wax and a synthetic wax is particularly preferred.

The wax is preferably a solid at room temperature (25° C.). The melting point (° C.) of the wax is preferably 40° C. or more to 120° C. or less, more preferably 50° C. or more to 100° C. or less. The melting point of the wax may be measured in conformity with a test method described in the section 5.3.1 (Melting Point Testing Method) of JIS K 2235:1991 (Petroleum Waxes). In the cases of a microcrystalline wax, petrolatum and a mixture of a plurality of kinds of waxes, their melting points may be measured with higher accuracy by utilizing a test method described in the section 5.3.2 thereof. The melting point of the wax is susceptible to characteristics, such as a molecular weight (a larger molecular weight provides a higher melting point), a molecular structure (a linear structure provides a higher melting point but a branched structure provides a lower melting point), crystallinity (higher crystallinity provides a higher melting point) and a density (a higher density provides a higher melting point). Accordingly, the control of those characteristics can provide a wax having a desired melting point. The melting point of the wax in the ink may be measured, for example, as follows: after the wax fractionated by subjecting the ink to ultracentrifugation treatment has been washed and dried, its melting point is measured in conformity with each of the above-mentioned test methods.

The total content (% by mass) of the wax and the dispersant for dispersing the wax in the ink is 0.8% by mass or more to 5.0% by mass or less with respect to the total mass of the ink. When the total content of the wax and the dispersant for dispersing the wax is less than 0.8% by mass, it is difficult to obtain the effect on the abrasion resistance of the image. Meanwhile, when the total content of the wax and the dispersant for dispersing the wax is more than 5.0% by mass, the wax is liable to aggregate and hence the filter passability is reduced. The total content of the wax and the dispersant for dispersing the wax is more preferably 1.0% by mass or more to 4.0% by mass or less.

The total content (% by mass) of the wax and the dispersant for dispersing the wax in the ink is preferably from 0.10 times or more in terms of mass ratio with respect to the content (% by mass) of the resin particle. It is conceived that, when the wax is less liable to be embedded in the resin particle, the abrasion resistance of the image is easily increased. The mass ratio is preferably 1.00 times or less.

[Dispersant]

The ink contains a dispersant for dispersing a wax. That is, the wax is dispersed in the ink with the dispersant. The content (% by mass) of the dispersant in the ink is preferably 0.01% by mass or more to 5.0% by mass or less, more preferably 0.02% by mass or more to 4.0% by mass or less with respect to the total mass of the ink. The content is particularly preferably 0.1% by mass or more to 3.0% by mass or less. Examples of the dispersant of the wax may include: a surfactant; and a resin having a hydrophilic group, such as a sulfonic acid group or a carboxylic acid group. Examples of the resin having a hydrophilic group may include: a resin obtained by graft polymerization of a hydrophilic group; and a resin having a unit derived from each of a monomer having hydrophilicity and a monomer having a hydrophobic moiety.

A combination of a nonionic dispersant and an anionic dispersant is preferably used as the dispersant of the wax.

When the wax is dispersed with the nonionic dispersant and the anionic dispersant, dispersion stabilization of a wax is achieved by two repulsive forces of steric repulsion by the nonionic dispersant and electrostatic repulsion by an anionic group of the anionic dispersant. Thus, storage stability of the ink becomes more satisfactory.

An example of the nonionic dispersant is a compound having an ethylene oxide structure such as a nonionic surfactant. Examples of the nonionic surfactant include: a polyoxyethylene alkyl ether, such as polyoxyethylene lauryl ether, polyoxyethylene cetyl ether or polyoxyethylene oleyl ether; and an ethylene oxide adduct of acetylene glycol. Of those, a polyoxyethylene alkyl ether is preferred. The content (% by mass) of the nonionic dispersant in the ink is preferably 0.01% by mass or more to 2.5% by mass or less, more preferably 0.02% by mass or more to 2.0% by mass or less with respect to the total mass of the ink.

Examples of the anionic dispersant include: an anionic surfactant; and a resin having an anionic group such as an acrylic resin. A carboxylic acid salt, a sulfonic acid salt, a sulfuric acid ester salt, a phosphoric acid ester salt or the like may be used as the anionic surfactant. Specific examples thereof include an alkyl benzene sulfonic acid salt, a polyoxyethylene alkyl ether sulfuric acid ester salt and a polyoxyethylene alkyl ether sulfonic acid salt. An example of the resin having an anionic group is an acrylic resin having a unit derived from (meth)acrylic acid. Of those, an ethylene-acrylic acid copolymer is preferred. In addition, examples thereof include a linear higher carboxylic acid (salt) and sulfonic acid (salt). Specifically, montanic acid, isomerized linoleic acid, and salt thereof can be mentioned. The content (% by mass) of the anionic dispersant in the ink is preferably 0.01% by mass or more to 2.5% by mass or less, more preferably 0.02% by mass or more to 2.0% by mass or less with respect to the total mass of the ink.

[Resin Particle]

The ink is required to contain a resin particle from the viewpoint of abrasion resistance. The term "resin particle" as used herein means a resin that is dispersed in an aqueous medium and may be present in the aqueous medium in a state having a particle diameter. Thus, the resin particle is present in a state of being dispersed in the ink, that is, in a state of a resin emulsion. In addition, the resin particle may accommodate a coloring material (e.g., an invisible coloring material that exhibits a color with a dye, a pigment, fluorescence or the like) but the resin particle preferably accommodates no coloring material.

Whether or not a given resin is a "resin particle" may be judged in accordance with the following method. First, a liquid (resin solid content: 10% by mass) containing the resin neutralized with an alkali (e.g., sodium hydroxide or potassium hydroxide) corresponding to its acid value is prepared. Next, the prepared liquid is diluted 10-fold (on a volume basis) with pure water to prepare a sample solution. Then, in the case where the particle diameter of the resin in the sample solution is measured by a dynamic light scattering method, when a particle having a particle diameter is measured, the resin may be judged to be a "resin particle". A particle size analyzer (e.g., an analyzer available under the product name "UPA-EX150" from Nikkiso Co., Ltd.) or the like may be used as a particle size distribution measuring device based on the dynamic light scattering method. Measurement conditions in this case may be set, for example, as follows: SetZero: 30 seconds, number of times of measurement: 3, measurement time: 180 seconds, shape: truly spherical shape, refractive index: 1.59. Of course, the particle size distribution measuring device to be used, the measurement conditions and the like are not limited to the foregoing. The purpose of measuring the particle diameter through use of the neutralized resin is to recognize that a particle is formed even when the resin is sufficiently neutralized to make it more difficult to form a particle. The resin having a shape of a particle even under such conditions is present in a state of a particle even in an aqueous ink.

Examples of the resin composing the resin particle may include an acrylic resin, a urethane-based resin and an olefin-based resin. Of those, an acrylic resin and a urethane-based resin are preferred and an acrylic resin including a unit derived from (meth)acrylic acid or a (meth)acrylate is more preferred. The resin particles may be used alone or in combination thereof

[Acrylic Resin]

A resin having a hydrophilic unit and a hydrophobic unit as its structural units is preferred as the acrylic resin. Of those, a resin having a hydrophilic unit derived from (meth) acrylic acid and a hydrophobic unit derived from at least one selected from the group consisting of monomers having an aromatic ring and a (meth)acrylic acid ester-based monomer is preferred. A resin having a hydrophilic unit derived from (meth)acrylic acid and a hydrophobic unit derived from at least one monomer selected from the group consisting of styrene and $\alpha$-methylstyrene is particularly preferred.

The hydrophilic unit is a unit having a hydrophilic group such as an anionic group. The hydrophilic unit may be formed by, for example, polymerizing a hydrophilic monomer having a hydrophilic group. Specific examples of the hydrophilic monomer having a hydrophilic group may include: acidic monomers each having a carboxylic acid group, such as (meth)acrylic acid, itaconic acid, maleic acid and fumaric acid; and anionic monomers, such as anhydrides and salts of these acidic monomers. A cation for forming the salt of the acidic monomer may be, for example, a lithium, sodium, potassium, ammonium or organic ammonium ion.

The hydrophobic unit is a unit free of a hydrophilic group such as an anionic group. The hydrophobic unit may be formed by, for example, polymerizing the hydrophobic monomer free of a hydrophilic group such as anionic group. Specific examples of the hydrophobic monomer may include: monomers each having an aromatic ring, such as styrene, $\alpha$-methylstyrene and benzyl (meth)acrylate; and (meth)acrylic acid ester-based monomers, such as methyl (meth)acrylate, butyl (meth)acrylate and 2-ethylhexyl (meth)acrylate.

[Urethane-Based Resin]

The urethane-based resin may be obtained by, for example, causing a polyisocyanate and a polyol to react with each other. In addition, a chain extender may be further caused to react with the reaction product. Examples of the olefin-based resin may include polyethylene and polypropylene.

[Polyester Resin]

A polyester resin is a resin formed of a unit derived from a polyhydric alcohol and a unit derived from a polyvalent carboxylic acid. A polyhydric alcohol that forms the unit derived from a polyhydric alcohol for forming the polyester resin is, for example, a polyhydric alcohol that is dihydric to tetrahydric. Examples of the structure of the polyhydric alcohol include polyhydric alcohols each having an aliphatic group, polyhydric alcohols each having an aromatic group and sugar alcohols. Specific examples of the polyhydric alcohol include: dihydric alcohols, such as ethylene glycol [1,2-ethanediol], neopentyl glycol [2,2-dimethyl-1,3-propanediol], 1,3-propanediol, 1,4-butanediol, benzenediol and 2,2-bis(4-hydroxyphenyl)propane [bisphenol A]; trihydric alcohols, such as glycerin, trimethylolethane and trimethylolpropane; and tetrahydric alcohols such as pentaerythritol. In addition, an oligomer (such a low-molecular-weight polymer as to have a molecular weight of 1,000 or less) may be used as the polyhydric alcohol.

Of those, polyhydric alcohols that are dihydric or trihydric are preferably used because the weight average molecular weight of the polyester resin can be easily adjusted. In addition, from the viewpoint of the structure, polyhydric alcohols each having an aliphatic group or polyhydric alcohols each having an aromatic group are preferably used. Polyhydric alcohols each having a linear or branched aliphatic group having 1 to 6 carbon atoms are more preferred as the polyhydric alcohols each having an aliphatic group. In particular, ethylene glycol, neopentyl glycol, bisphenol A or glycerin is preferably used and a combination of two or more kinds thereof is also preferably used. In addition, when the polyhydric alcohol having an aliphatic group is used, the following setting is preferred. That is, the ratio of a unit derived from the "polyhydric alcohol having a linear or branched aliphatic group having 1 to 6 carbon atoms" in a unit derived from the polyhydric alcohol having an aliphatic group in the polyester resin is preferably 70 mol % or more. The ratio is more preferably 100 mol %.

A polyvalent carboxylic acid that forms a unit derived from a polyvalent carboxylic acid for forming the polyester resin through a reaction is, for example, polyvalent carboxylic acids that are divalent to tetravalent. Examples of the structure of the polyvalent carboxylic acid include polyvalent carboxylic acids each having an aliphatic group, polyvalent carboxylic acid each having an aromatic group and nitrogen-containing polyvalent carboxylic acids. Specific examples of the polyvalent carboxylic acid include: divalent carboxylic acids, such as glutaric acid, adipic acid, terephthalic acid, isophthalic acid and 2,6-naphthalenedicarboxylic acid; trivalent carboxylic acids such as trimellitic acid; and tetravalent carboxylic acids such as ethylenediaminetetraacetic acid. In addition, an oligomer (such a low-molecular-weight polymer as to have a molecular weight of 1,000 or less) may be used as the polyvalent carboxylic acid.

Polyvalent carboxylic acids that are divalent or trivalent are preferably used because the weight average molecular weight of the polyester resin and the acid value thereof can be easily adjusted. In addition, from the viewpoint of the structure, carboxylic acids each having an aliphatic group or carboxylic acids each having an aromatic group are preferably used. In particular, adipic acid, terephthalic acid, isophthalic acid or trimellitic acid is preferably used and a combination of two or more kinds thereof is also preferably used.

The content (% by mass) of the resin particle in the ink is preferably 2.0% by mass or more to 50.0% by mass or less, more preferably 2.0% by mass or more to 20.0% by mass or less with respect to the total mass of the ink.

The acid value of a resin for forming the resin particle is preferably 5 mgKOH/g or more to 100 mgKOH/g or less. The weight-average molecular weight of the resin for forming the resin particle is preferably 1,000 or more to 3,000,000 or less, more preferably 100,000 or more to 3,000,000 or less. The volume-based 50% cumulative particle diameter ($D_{50}$) of the resin particle measured by a dynamic light scattering method is preferably 50 nm or more to 500 nm or less. The glass transition temperature of the resin particle is preferably 40° C. or more to 120° C. or less, more preferably 50° C. or more to 100° C. or less. The glass transition temperature (° C.) of the resin particle may be measured with a differential scanning calorimeter (DSC).

[Production Method for Resin Particle]

The resin particle may be produced in accordance with a conventionally known method, such as an emulsion polymerization method, a mini-emulsion polymerization method, a seed polymerization method or a phase inversion emulsification method. Of those, an emulsion polymerization method and a seed polymerization method are preferred because a resin particle having a more uniform particle diameter can be produced. When the resin particle having a more uniform particle diameter is used, the ejection stability of the ink by the ink jet system can be further improved.

[Water-Soluble Resin]

The ink may contain a water-soluble resin in addition to the resin particle. The water-soluble resin may be added to the ink for (i) stabilizing the dispersed state of the pigment, that is, as a resin dispersant or an aid therefor. In addition, the water-soluble resin may be added to the ink for (ii) improving the various characteristics of an image to be recorded.

The content (% by mass) of the water-soluble resin in the ink is preferably 0.1% by mass or more to 20.0% by mass or less, more preferably 0.5% by mass or more to 15.0% by mass or less. Examples of the form of the water-soluble resin may include a block copolymer, a random copolymer, a graft copolymer and a combination thereof. The water-soluble resins may be used alone or in combination thereof.

The same resin as the above-mentioned resin for forming the resin particle may be appropriately selected and used as the water-soluble resin. Examples thereof include a styrene-(meth)acrylic acid copolymer, a (meth)acrylic ester-(meth) acrylic acid copolymer, a poly(meth)acrylic acid resin, a poly (meth)acrylic acid ester resin, a polyurethane resin, a polyamide resin and a polyvinyl alcohol resin. Those resins may be used alone or in combination thereof. A base may be used for improving the solubility of the water-soluble resin in water. An inorganic base, such as lithium hydroxide, sodium hydroxide or potassium hydroxide, may be used as such base. In addition, the base is preferably an organic amine, such as ammonia, dimethylamine, monoethanolamine, diethanolamine, triethanolamine, aminomethyl propanol or N,N-dimethylethanolamine. Those bases may be used alone or in combination thereof. The acid value of the water-soluble resin is preferably 100 mgKOH/g or more to 250 mgKOH/g or less. The weight average molecular weight of the water-soluble resin is preferably 3,000 or more to 15,000 or less.

[Aqueous Medium]

The ink to be used in the recording method of the present invention is an aqueous ink including at least water as an aqueous medium. An aqueous medium that is the water or a mixed solvent of the water and a water-soluble organic solvent may be incorporated into the ink. Deionized water or ion-exchanged water is preferably used as the water. The content (% by mass) of the water in the aqueous ink is preferably 45.0% by mass or more to 92.0% by mass or less with respect to the total mass of the ink. In addition, the content (% by mass) of the water-soluble organic solvent in the aqueous ink is preferably 3.0% by mass or more to 25.0% by mass or less with respect to the total mass of the ink. Solvents that may be used in an ink for ink jet, such as alcohols, (poly)alkylene glycols, glycol ethers, nitrogen-containing solvents and sulfur-containing solvents, may each be used as the water-soluble organic solvent. The water-soluble organic solvent may also include a water-soluble organic compound that is solid at room temperature, such as urea, urea derivative, trimethylolpropane, and trimethylolethane. The water-soluble organic solvents may be used alone or in combination thereof

[Other Component]

The ink may include various other components as required. Examples of other components may include various additives, such as a pH adjustor, a rust inhibitor, an antiseptic, a fungicide, an antioxidant and an anti-reducing agent. However, the ink is preferably free of the reactant to be incorporated into the reaction liquid.

[Physical Properties of Ink]

The ink is an aqueous ink to be applied to an ink jet system. Accordingly, from the viewpoint of reliability, it is preferred that the physical property values of the ink be appropriately controlled. Specifically, the surface tension of the ink at 25° C. is preferably 20 mN/m or more to 60 mN/m or less. In addition, the viscosity of the ink at 25° C. is preferably 1.0 mPa·s or more to 10.0 mPa·s or less. The pH of the ink at 25° C. is preferably 7.0 or more to 9.5 or less, more preferably 8.0 or more to 9.5 or less.

In addition, when the ink is stored in the ink storage bag, the ink is deaerated to be a deaerated ink having a dissolved oxygen amount (mg/L) in the ink of 3.0 mg/L or less. For example, a deaeration module using a hollow fiber may be used in the deaeration treatment of the ink. The dissolved oxygen amount may be measured by using a known method. For example, the measurement may be performed by using a diaphragm electrode method. The dissolved oxygen amount (mg/L) in the ink is preferably 1.0 mg/L or more.

<Reaction Liquid>

The recording method of the present invention preferably includes a reaction liquid applying step of applying an aqueous reaction liquid, which contains a reactant that reacts with the aqueous ink, to the recording medium. In particular, it is preferable to have the reaction liquid applying step, or to perform the ink applying step and the reaction liquid applying step in parallel, before the ink applying step of applying the aqueous ink to the recording medium. Respective components to be used in the reaction liquid and the like are described in detail below.

[Reactant]

The reaction liquid is brought into contact with the ink to react with the ink, to thereby aggregate components (a resin, a surfactant, and a component having an anionic group such as a self-dispersible pigment) in the ink. The reaction liquid contains the reactant. When the reactant is present, at the time of contact between the ink and the reactant on the recording medium, the state of presence of the component having an anionic group in the ink is destabilized and hence the aggregation of the ink can be accelerated. Examples of the reactant may include: a polyvalent metal ion; a cationic component such as a cationic resin; and an organic acid. The reactants may be used alone or in combination thereof.

Examples of the polyvalent metal ion forming a polyvalent metal salt may include: divalent metal ions, such as $Ca^{2+}$, $Cu^{2+}$, $Ni^{2+}$, $Mg^{2+}$, $Sr^{2+}$, $Ba^{2+}$ and $Zn^{2+}$; and trivalent metal ions, such as $Fe^{3+}$, $Cr^{3+}$, $Y^{3+}$ and $Al^{3+}$. A water-soluble polyvalent metal salt (which may be a hydrate) made up of the polyvalent metal ion and an anion bonded to each other may be used to incorporate the polyvalent metal ion into the reaction liquid. Examples of such anion may include: inorganic anions, such as $Cl^-$, $Br^-$, $I^-$, $ClO^-$, $ClO_2^-$, $ClO_3^-$, $ClO_4^-$, $NO_2^-$, $NO_3^-$, $SO_4^{2-}$, $CO_3^{2-}$, $HCO_3^-$, $PO_4^{3-}$, $HPO_4^{2-}$ and $H_2PO_4^-$; and organic anions, such as $HCOO^-$, $(COO^-)_2$, $COOH(COO^-)$, $CH_3COO^-$, $CH_3CH(OH)COO^-$, $C_2H_4(COO^-)_2$, $C_6H_5COO^-$, $C_6H_4(COO^-)_2$ and $CH_3SO_3^-$. When the polyvalent metal ion is used as the reactant, its content (% by mass) in terms of polyvalent metal salt in the reaction liquid is preferably 1.0% by mass or more to 20.0% by mass or less with respect to the total mass of the reaction liquid. In this specification, when the polyvalent metal salt is a hydrate, the "content (% by mass) of the polyvalent metal salt" in the reaction liquid means the "content (% by mass) of the anhydride of the polyvalent metal salt" obtained by removing water serving as a hydrate.

The reaction liquid containing the organic acid has a buffering capacity in an acidic region (at a pH of less than 7.0, preferably at a pH of from 2.0 to 5.0) to efficiently turn the anionic group of the components present in the ink into an acid type, to thereby aggregate the ink. Examples of the organic acid may include: monocarboxylic acids, such as formic acid, acetic acid, propionic acid, butyric acid, benzoic acid, glycolic acid, lactic acid, salicylic acid, pyrrolecarboxylic acid, furancarboxylic acid, picolinic acid, nicotinic acid, thiophenecarboxylic acid, levulinic acid and coumalic acid, and salts thereof; dicarboxylic acids, such as oxalic acid, malonic acid, succinic acid, glutaric acid, adipic acid, maleic acid, fumaric acid, itaconic acid, sebacic acid, phthalic acid, malic acid and tartaric acid, and salts and hydrogen salts thereof tricarboxylic acids, such as citric acid and trimellitic acid, and salts and hydrogen salts thereof; and tetracarboxylic acids such as pyromellitic acid, and salts and hydrogen salts thereof. When the organic acid is used as the reactant, the content (% by mass) of the organic acid in the reaction liquid is preferably 1.0% by mass or more to 50.0% by mass or less with respect to the total mass of the reaction liquid.

Examples of the cationic resin may include resins having structures of primary to tertiary amines and resins having structures of quaternary ammonium salts. Specific examples thereof may include resins having structures of, for example, vinylamine, allylamine, vinylimidazole, vinylpyridine, dimethylaminoethyl methacrylate, ethylene imine, guanidine, diallyldimethylammonium chloride and an alkylamine-epichlorohydrin condensate. To improve solubility in the reaction liquid, the cationic resin and an acidic compound may be used in combination or the cationic resin may be subjected to quaternization treatment. When the cationic resin is used as the reactant, the content (% by mass) of the cationic resin in the reaction liquid is preferably 0.1% by mass or more to 10.0% by mass or less with respect to the total mass of the reaction liquid.

[Aqueous Medium]

The reaction liquid is an aqueous reaction liquid containing at least water as an aqueous medium. Examples of the aqueous medium to be used in the reaction liquid may include the same examples as those of an aqueous medium that can be incorporated into the ink to be described above.

[Other Component]

The reaction liquid may contain various other components as required. Examples of the other components may include the same examples as those of other components that can be incorporated into the ink to be described above.

[Physical Properties of Reaction Liquid]

The reaction liquid is an aqueous reaction liquid to be applied to an ink jet system. Accordingly, from the viewpoint of reliability, it is preferred that the physical property values of the reaction liquid be appropriately controlled. Specifically, the surface tension of the reaction liquid at 25° C. is preferably 20 mN/m or more to 60 mN/m or less. In addition, the viscosity of the reaction liquid at 25° C. is preferably 1.0 mPa·s or more to 10.0 mPa·s or less. The pH of the reaction liquid at 25° C. is preferably 5.0 or more to 9.5 or less, more preferably 6.0 or more to 9.0 or less.

EXAMPLES

The present invention is described in more detail below by way of Examples and Comparative Examples. The present invention is by no means limited to Examples below without departing from the gist of the present invention. "Part(s)" and "%" with regard to the description of the amounts of components are by mass unless otherwise stated.

<Measurement of Physical Property Values>

(Dissolved Oxygen Amount)

The dissolved oxygen amount in the ink was measured with a dissolved oxygen meter (product name: "Portable Dissolved Oxygen Meter OM-71-L1", manufactured by Horiba, Ltd.).

<Preparation of Polyester Resin>

(Polyester Resin)

60.0 Parts of ethylene glycol, 40.0 parts of neopentyl glycol, 54.5 parts of terephthalic acid and 54.5 parts of isophthalic acid were loaded into a reaction vessel set in an autoclave, and were heated at 220° C. for 4 hours to be subjected to an esterification reaction. Next, a temperature in the reaction vessel was increased to 240° C. and a pressure in the autoclave was reduced to 13 Pa over 90 minutes. The decompressed state of 240° C. and 13 Pa was kept for 5 hours to continue the esterification (dehydration condensation) reaction and then a nitrogen gas was introduced into the autoclave to return the pressure to normal pressure (1 atm). The temperature in the reaction vessel had been lowered to 220° C., a catalyst (tetra-n-butyl titanate) and 1.0 part of trimellitic acid were added and the mixture was heated at 220° C. for 2 hours to be subjected to a transesterification reaction. The usage amount (mol) of the catalyst was set to $3 \times 10^{-4} \times$(total usage amount of polyvalent carboxylic acid (mol))." After that, a nitrogen gas was introduced into the autoclave to establish a pressurized state and a sheet-shaped resin was taken out. The resin was cooled to 25° C. and was then pulverized with a crusher to provide a polyester resin.

<Preparation of Aqueous Dispersion of Resin Particle>

(Aqueous Dispersion of Resin Particle 1)

A stirrer (product name: "TORNADO STIRRER STANDARD SM-104", manufactured by AS ONE Corporation) was set in a beaker having a volume of 2 L. The beaker was loaded with 200 g of the above-mentioned polyester resin and methyl ethyl ketone (MEK) and the contents were stirred at 30° C. so that the polyester resin was dissolved. Next, 15.9 g of a 5% aqueous solution of potassium hydroxide was added and the mixture was stirred for 30 minutes. Under the stirring at 30° C., 500 g of deionized water was added dropwise at a rate of 20 mL/min. After that, the temperature was increased to 60° C., and then MEK was removed by evaporation and part of water was also removed by evaporation. After cooling to 25° C., the resultant was filtered through a 150-mesh wire mesh (filter having 150 stainless-steel wires woven in each of longitudinal and latitudinal directions per inch square) and the concentration of the resin particle was adjusted to 25.0% with deionized water. Thus, an aqueous dispersion liquid of a resin particle 1 serving as a polyester resin particle was obtained.

(Aqueous Dispersion Liquid of Resin Particle 2)

About 1,160 mL of water was heated to 90° C. in a reaction vessel. In addition, a solution obtained by incorporating 1.39 g of potassium persulfate as a polymerization initiator into 160 mL of water was also prepared. First, 32 mL of the initiator solution was added to the reaction vessel and the contents were stirred. Separately, a first monomer emulsion obtained by incorporating 183 g of styrene, 80 g of benzyl acrylate, 1.5 g of methacrylic acid, 1.6 g of an isooctyl thioglycolate chain transfer agent and 9.98 g of a 30% aqueous solution of an anionic surfactant (product name: "Rhodafac RS 710", manufactured by Rhodia Novecare) into 159.4 mL of water was prepared. The monomer emulsion was added dropwise into the reaction vessel over 30 minutes and the mixture was stirred. At the same time, 129.4 g of the initiator solution was added dropwise into the reaction vessel over the same time period. The resultant reaction product was stirred and maintained at 90° C. for 3 hours. Next, the reaction product was cooled to 2.5° C. After that, the pH of a latex solution thus formed was adjusted to 8.5 by adding potassium hydroxide (50% aqueous solution). After the contents had been cooled to an ambient temperature, the latex solution was filtered through a 200-mesh filter and the concentration of a resin particle was adjusted to 25.0% with deionized water. Thus, an aqueous dispersion liquid of a resin particle 2 serving as an acrylic resin particle was obtained.

<Preparation of Pigment Dispersion Liquid>
(Pigment Dispersion Liquid 1)

1.5 Grams of 4-aminophthalic acid was added to a solution obtained by dissolving 5.0 g of concentrated hydrochloric acid in 5.5 g of ion-exchanged water while the solution was cooled to 5° C. Next, a container containing the resultant solution was loaded into an ice bath and the solution was stirred. Thus, a state in which the solution was constantly held at 10° C. or less was achieved. Then, a solution obtained by dissolving 0.9 g of sodium nitrite in 9.0 g of ion-exchanged water at 5° C. was added thereto. After the solution had been further stirred for 15 minutes, 6.0 g of a pigment (carbon black) was added to the solution under stirring. After that, the whole was further stirred for 15 minutes. The resultant slurry was filtered with filter paper (product name: "STANDARD FILTER PAPER No. 2", manufactured by Advantec). After that, a particle remaining on the filter paper was sufficiently washed with water and dried in an oven at 110° C. After that, a sodium ion was substituted with a potassium ion by an ion exchange method. Thus, a self-dispersion pigment in which a —$C_6H_4$—(COOK)$_2$ group was bonded to a surface of a pigment particle was prepared. An appropriate amount of ion-exchanged water was added thereto. Thus, a pigment dispersion liquid 1 was obtained. The content of the pigment (carbon black) in the pigment dispersion liquid 1 was 20.0%.

(Pigment Dispersion Liquid 2)

A styrene-ethyl acrylate-acrylic acid copolymer (resin 1) having an acid value of 150 mgKOH/g and a weight average molecular weight of 8,000 was prepared. 20.0 Parts of the resin 1 was neutralized with potassium hydroxide whose molar amount was equivalent to its acid value. After that, an appropriate amount of pure water was added to the neutralized product to prepare an aqueous solution of the resin 1 in which the content of the resin (solid content) was 20.0%. 10.0 Parts of a pigment (C.I. Pigment Blue 15:3), 15.0 parts of the aqueous solution of the resin 1 and 75.0 parts of pure water were mixed to provide a mixture. The resultant mixture and 200 parts of zirconia beads each having a diameter of 0.3 mm were loaded into a batch-type vertical sand mill (manufactured by AIMEX Co., Ltd.) and the mixture was dispersed for 5 hours while being cooled with water. Centrifugation was performed to remove a coarse particle. After that, pressure filtration was performed through a cellulose acetate filter having a pore size of 3.0 μm (manufactured by Advantec). Thus, a pigment dispersion liquid 2 having a pigment (C.I. Pigment Blue 15:3) content of 20.0% and a resin dispersant (resin 1) content of 10.0% was prepared.

(Pigment Dispersion Liquid 3)

A pigment dispersion liquid 3 having a pigment (solid solution pigment of C.I. Pigment Violet 19 and C.I. Pigment Red 122) content of 20.0% and a resin dispersant (resin 1) content of 10.0% was prepared by the same procedure as in the method of preparing the pigment dispersion liquid 2 described above except that the pigment was changed to a solid solution pigment of C.I. Pigment Violet 19 and C.I. Pigment Red 122.

(Pigment Dispersion Liquid 4)

A pigment dispersion liquid 4 having a pigment (C.I. Pigment Red 150) content of 20.0% and a resin dispersant (resin 1) content of 10.0% was prepared by the same procedure as in the method of preparing the pigment dispersion liquid 2 described above except that the pigment was changed to C.I. Pigment Red 150.

(Pigment Dispersion Liquid 5)

A pigment dispersion liquid 5 having a pigment (C.I. Pigment Yellow 74) content of 20.0% and a resin dispersant (resin 1) content of 10.0% was prepared by the same procedure as in the method of preparing the pigment dispersion liquid 2 described above except that the pigment was changed to C.I. Pigment Yellow 74.

(Pigment Dispersion Liquid 6)

A pigment dispersion liquid 6 having a pigment (carbon black) content of 20.0% and a resin dispersant (resin 1) content of 10.0% was prepared by the same procedure as in the method of preparing the pigment dispersion liquid 2 described above except that the pigment was changed to carbon black.

<Preparation of Aqueous Dispersion Liquid of Wax Particle>
(Aqueous Dispersion Liquid of Wax Particle 1)

A Fischer-Tropsch wax (product name: "FT-0165", melting point: 73° C., manufactured by Nippon Seiro Co., Ltd.) was used as the wax and polyoxyethylene cetyl ether (product name: "NIKKOL BC-15", manufactured by Nikko Chemicals Co., Ltd.) was used as the nonionic dispersant (nonionic surfactant). 25.0 Parts of the above-mentioned wax, 5.0 parts of the above-mentioned nonionic surfactant, 1.0 part of an ethylene acrylic acid copolymer (anionic dispersant) and 1.0 part of triethanolamine were added to 68.0 parts of water. The mixture was dispersed until the volume average particle diameter $D_{50}$ became 180 nm with appropriate temperature and pressure adjustment. Subsequently, pressure filtration with a cellulose acetate filter having a pore size of 3.0 μm (manufactured by Advantec) and dilution treatment with ion-exchanged water were performed to provide an aqueous dispersion liquid of a wax particle 1 having a total content of a wax and a dispersant of 25.0%. The volume average particle diameter $D_{50}$ is the diameter of the particle in a particle diameter cumulative curve at which the ratio of the particle integrated from small particle diameters reaches 50% with respect to the total volume of the measured particle. The above-mentioned volume average particle diameter $D_{50}$ was measured with the above-mentioned particle size analyzer of a dynamic light scattering system and under the above-mentioned measurement conditions.

The ethylene acrylic acid copolymer was synthesized as described below. Specifically, a copolymer formed of ethylene and acrylic acid were synthesized by an ordinary method and the resultant was neutralized with a neutralizer whose molar amount was equivalent to its acid value, and ion-exchanged water was evaporated to dryness under reduced pressure. Thus, a solid ethylene acrylic acid copolymer was obtained. The ethylene acrylic acid copolymer has an acid value of 120 mgKOH/g and a weight average molecular weight of 8,000.

(Aqueous Dispersion Liquid of Wax Particle 2)

The same procedure was performed as in the method of preparing the aqueous dispersion liquid of the wax particle 1 described above except that polyoxyethylene lauryl ether (product name: "NIKKOL BL-21", manufactured by Nikko Chemicals Co., Ltd.) was used as the nonionic dispersant. Thus, an aqueous dispersion liquid of a wax particle 2 having a total content of a wax and a dispersant of 25.0% was obtained.

(Aqueous Dispersion Liquid of Wax Particle 3)

The same procedure was performed as in the method of preparing the aqueous dispersion liquid of the wax particle 1 described above except that the nonionic dispersant was not used and the usage amount of the ethylene acrylic acid copolymer serving as the anionic dispersant was changed to 6.0 parts. Thus, an aqueous dispersion liquid of a wax particle 3 having a total content of a wax and a dispersant of 25.0% was obtained.

(Aqueous Dispersion Liquid of Wax Particle 4)

The same procedure was performed as in the method of preparing the aqueous dispersion liquid of the wax particle 1 described above except that the anionic dispersant was not used and the usage amount of the nonionic dispersant was changed to 6.0 parts. Thus, an aqueous dispersion liquid of a wax particle 4 having a total content of a wax and a dispersant of 25.0% was obtained.

(Aqueous Dispersion Liquid of Wax Particle 5)

The same procedure was performed as in the method of preparing the aqueous dispersion liquid of the wax particle 1 described above except that the dispersion treatment was performed until of the volume average particle diameter of the wax particle became 130 nm. Thus, an aqueous dispersion liquid of a wax particle 5 having a total content of a wax and a dispersant of 25.0% was obtained.

(Aqueous Dispersion Liquid of Wax Particle 6)

The same procedure was performed as in the method of preparing the aqueous dispersion liquid of the wax particle 1 described above except that a polyethylene wax (product name: "AC-8", manufactured by Honeywell, melting point: 92° C. to 126° C.) was used as the wax. Thus, an aqueous dispersion liquid of a wax particle 6 having a total content of a wax and a dispersant of 25.0% was obtained.

(Aqueous Dispersion Liquid of Wax Particle 7)

The same procedure was performed as in the method of preparing the aqueous dispersion liquid of the wax particle 1 described above except that a paraffin wax (product name: "Paraffin Wax-155", manufactured by Nippon Seiro Co., Ltd., melting point: 69° C.) was used as the wax. Thus, an aqueous dispersion liquid of a wax particle 7 having a total content of a wax and a dispersant of 25.0% was obtained.

(Aqueous Dispersion Liquid of Wax Particle 8)

The same procedure was performed as in the method of preparing the aqueous dispersion liquid of the wax particle 1 described above except that oleic acid was used as the anionic dispersant. Thus, an aqueous dispersion liquid of a wax particle 8 having a total content of a wax and a dispersant of 25.0% was obtained.

<Preparation of Ink>

Respective components (unit: %) shown in the upper section of each of Tables 1 (Table 1-1 and 1-2) were mixed, sufficiently stirred and then filtered under pressure through a cellulose acetate filter (manufactured by Advantec) having a pore size of 0.8 μm to prepare respective inks. The term "Capstone FS-3100" shown in Tables 1 represents the product name of a surfactant manufactured by The Chemours Company. The term "ACETYLENOL E100" represents the product name of a surfactant manufactured by Kawaken Fine Chemicals Co., Ltd. The term "Proxel GXL (S)" represents the product name of an antifungal agent manufactured by Arch Chemicals, Inc. As the characteristics of the inks, the total content W+D (%) of the wax and the dispersant for dispersing the wax, the content R (%) of the resin particle and the value (times) of (W+D)/R with respect to the total mass of the ink are shown in the lower section of each of Tables 1.

TABLE 1

| Compositions and properties of inks | | | | | | | | | | | | |
|---|---|---|---|---|---|---|---|---|---|---|---|---|
| | Ink | | | | | | | | | | | |
| | 1 | 2 | 3 | 4 | 5 | 6 | 7 | 8 | 9 | 10 | 11 | 12 |
| Pigment dispersion liquid 1 | | | | | | | | | | 20.0 | | |
| Pigment dispersion liquid 2 | 20.0 | 20.0 | 20.0 | 20.0 | 20.0 | 20.0 | 20.0 | 20.0 | 20.0 | | | |
| Pigment dispersion liquid 3 | | | | | | | | | | | 15.0 | |
| Pigment dispersion liquid 4 | | | | | | | | | | | 5.0 | |
| Pigment dispersion liquid 5 | | | | | | | | | | | | 20.0 |
| Pigment dispersion liquid 6 | | | | | | | | | | | | |
| Water dispersion of Wax particle 1 | 12.0 | 3.2 | 20.0 | 10.0 | | | | | | 12.0 | 12.0 | 12.0 |
| Water dispersion of Wax particle 2 | | | | | 12.0 | | | | | | | |
| Water dispersion of Wax particle 3 | | | | | | | | | | | | |
| Water dispersion of Wax particle 4 | | | | | | | | | | | | |
| Water dispersion of Wax particle 5 | | | | | | | 12.0 | | | | | |
| Water dispersion of Wax particle 6 | | | | | | | | 12.0 | | | | |
| Water dispersion of Wax particle 7 | | | | | | | | | 12.0 | | | |

TABLE 1-continued

Compositions and properties of inks

| | | | | | | | | | | | | |
|---|---|---|---|---|---|---|---|---|---|---|---|---|
| Water dispersion of Wax particle 8 | | | | | | 12.0 | | | | | | |
| Water dispersion of Resin particle 1 | | | | | | | | | | | | |
| Water dispersion of Resin particle 2 | 32.0 | 32.0 | 20.0 | 20.0 | 32.0 | 32.0 | 32.0 | 32.0 | 32.0 | 32.0 | 32.0 | 32.0 |
| Capstone FS-3100 | | | | | | | | | | | | |
| Acetylenol E60 | 1.0 | 1.0 | 1.0 | 1.0 | 1.0 | 1.0 | 1.0 | 1.0 | 1.0 | 1.0 | 1.0 | 1.0 |
| 1,2-Butanediol | 20.0 | 20.0 | 20.0 | 20.0 | 20.0 | 20.0 | 20.0 | 20.0 | 20.0 | 20.0 | 20.0 | 20.0 |
| 1,2-Propanediol | | | | | | | | | | | | |
| 1,2-Hexanediol | | | | | | | | | | | | |
| Proxel GXL(S) | 0.2 | 0.2 | 0.2 | 0.2 | 0.2 | 0.2 | 0.2 | 0.2 | 0.2 | 0.2 | 0.2 | 0.2 |
| Ion-exchanged water | 14.8 | 23.6 | 18.8 | 28.8 | 14.8 | 14.8 | 14.8 | 14.8 | 14.8 | 14.8 | 14.8 | 14.8 |
| Total content of wax and the dispersant for dispersing the wax W + D (%) | 3.0 | 0.8 | 5.0 | 2.5 | 3.0 | 3.0 | 3.0 | 3.0 | 3.0 | 3.0 | 3.0 | 3.0 |
| Resin particle content R (%) | 8.0 | 8.0 | 5.0 | 5.0 | 8.0 | 8.0 | 8.0 | 8.0 | 8.0 | 8.0 | 8.0 | 8.0 |
| Value of (W + D)/R (times) | 0.38 | 0.10 | 1.00 | 0.50 | 0.38 | 0.38 | 0.38 | 0.38 | 0.38 | 0.38 | 0.38 | 0.38 |

| | Ink | | | | | | | | | | | |
|---|---|---|---|---|---|---|---|---|---|---|---|---|
| | 13 | 14 | 15 | 16 | 17 | 18 | 19 | 20 | 21 | 22 | 23 | 24 |
| Pigment dispersion liquid 1 | | | | | | | | | | | | |
| Pigment dispersion liquid 2 | | 20.0 | 20.0 | 20.0 | 20.0 | 20.0 | 20.0 | 20.0 | 20.0 | 20.0 | 20.0 | 20.0 |
| Pigment dispersion liquid 3 | | | | | | | | | | | | |
| Pigment dispersion liquid 4 | | | | | | | | | | | | |
| Pigment dispersion liquid 5 | | | | | | | | | | | | |
| Pigment dispersion liquid 6 | 20.0 | | | | | | | | | | | |
| Water dispersion of Wax particle 1 | 12.0 | 12.0 | 12.0 | 12.0 | 12.0 | 12.0 | | | 3.6 | | 2.8 | 20.4 |
| Water dispersion of Wax particle 2 | | | | | | | | | | | | |
| Water dispersion of Wax particle 3 | | | | | | | 12.0 | | | 3.6 | | |
| Water dispersion of Wax particle 4 | | | | | | | | 12.0 | | | | |
| Water dispersion of Wax particle 5 | | | | | | | | | | | | |
| Water dispersion of Wax particle 6 | | | | | | | | | | | | |
| Water dispersion of Wax particle 7 | | | | | | | | | | | | |
| Water dispersion of Wax particle 8 | | | | | | | | | | | | |
| Water dispersion of Resin particle 1 | | 32.0 | | | | | | | | | | |
| Water dispersion of Resin particle 2 | 32.0 | | 32.0 | 32.0 | 32.0 | 32.0 | 32.0 | 32.0 | 40.0 | 40.0 | 18.0 | 32.0 |
| Capstone FS-3100 | | | 0.4 | | | | | | | | | |
| Acetylenol E60 | 1.0 | 1.0 | | 1.0 | 1.0 | 1.0 | 1.0 | 1.0 | 1.0 | 1.0 | 1.0 | 1.0 |
| 1,2-Butanediol | 20.0 | 20.0 | 20.0 | 15.0 | 15.0 | | 20.0 | 20.0 | 20.0 | 20.0 | 20.0 | 20.0 |
| 1,2-Propanediol | | | 5.0 | | | | | | | | | |
| 1,2-Hexanediol | | | | | 5.0 | 20.0 | | | | | | |
| Proxel GXL(S) | 0.2 | 0.2 | 0.2 | 0.2 | 0.2 | 0.2 | 0.2 | 0.2 | 0.2 | 0.2 | 0.2 | 0.2 |
| Ion-exchanged water | 14.8 | 14.8 | 15.4 | 14.8 | 14.8 | 14.8 | 14.8 | 14.8 | 15.2 | 15.2 | 38.0 | 6.4 |
| Total content of wax and the dispersant for dispersing the wax W + D (%) | 3.0 | 3.0 | 3.0 | 3.0 | 3.0 | 3.0 | 3.0 | 3.0 | 0.9 | 0.9 | 0.7 | 5.1 |
| Resin particle content R (%) | 8.0 | 8.0 | 8.0 | 8.0 | 8.0 | 8.0 | 8.0 | 8.0 | 10.0 | 10.0 | 4.5 | 8.0 |
| Value of (W + D)/R (times) | 0.38 | 0.38 | 0.38 | 0.38 | 0.38 | 0.38 | 0.38 | 0.38 | 0.09 | 0.09 | 0.16 | 0.64 |

<Preparation of Recording Medium>

The following recording media 1 to 3 were prepared.

Recording medium 1: a recording medium available under the product name "Scotchcal Graphic Film U1220-10" (manufactured by 3M, material: polyvinyl chloride, water absorption amount falls within the range of from 0 mL/m² or more to 10 mL/m² or less in a Bristow method from start of contact to 30 msec$^{1/2}$)

Recording medium 2: a recording medium available under the product name "OK Top Coat+" (manufactured by Oji Paper Co., Ltd., coated paper, water absorption amount is more than 10 mL/m² in the Bristow method from start of contact to 30 msec$^{1/2}$)

Recording medium 3: a recording medium available under the product name "OK PRINCE HIGH QUALITY" (manufactured by Oji Paper Co., Ltd., uncoated paper, water absorption amount is more than 10 mL/m² in the Bristow method from start of contact to 30 msec$^{1/2}$).

<Evaluation>

The respective inks thus prepared were filled into ink storage bags each having a layer configuration and shape shown in Table 2 and were each set to an ink jet recording apparatus (product name: "imagePROGRAF PRO-2000", manufactured by Canon Inc.) mounted with a recording head configured to eject an ink with thermal energy. At this time, the ink storage bag was arranged so that its direction was the gravity direction shown in Table 3 (See FIG. 1). Whether or not the shape was flat was judged by whether a width of the ink storage bag 50 in a Z direction was smaller than a width thereof in an X direction and a width thereof in a Y direction. In the recording apparatus, a heating device configured to dry a recording medium having applied thereto an ink by air blowing was incorporated at a downstream position of the recording head in the conveyance direction of the recording medium. In addition, the surface temperature of the recording medium was set to 80° C. through the heating of the heating device by the air blowing. In addition, a filter may be arranged in a liquid flow path inside the recording head of the recording apparatus. In Examples of the present invention, an image recorded under such a condition that 4 ng of one drop of the ink is applied to a unit region measuring $\frac{1}{1,200}$ inch by $\frac{1}{1,200}$ inch is defined as having a recording duty of 100%. Herein, in Table 2, when the ink storage bag includes a metal layer, a layer formed by metal deposition (metal deposited layer) was adopted. In addition, the innermost layer is a layer that is brought into contact with the ink in the layer configuration of the ink storage bag. A dissolved oxygen amount in the ink was set to a value shown in Table 3 with a deaeration module using a hollow fiber and the ink was filled. The dissolved oxygen amount in the ink was measured with the above-mentioned device.

TABLE 2

| Compositions of ink storage bags | | | |
| --- | --- | --- | --- |
| Ink storage bag | Metal layer | Shape | Material of innermost layer |
| 1 | Aluminium | Flat | Polyethylene |
| 2 | None | Flat | Polyethylene |
| 3 | Aluminium | Not flat | Polyethylene |
| 4 | Aluminium | Flat | Polypropylene |
| 5 | None | Not flat | Polypropylene |

The recording condition was set to an environment of 25° C. and a relative humidity of 50%. In addition, such a condition that a filter was arranged in the ink flow path and such a condition that no filter was arranged therein were set. When the filter was arranged in the ink flow path, a filter of a mesh made of stainless steel having an average pore diameter of 7 μm was used. In Example 20, a filter of a nonwoven fabric made of stainless steel having an average pore diameter of 10 μm was used. In addition, the above-mentioned filter was arranged in an ink supply flow path from the ink storage bag to the recording head. A solid image having a recording duty of 120% was recorded onto the recording medium with the above-mentioned ink jet recording apparatus in which the ink storage bag filled with the ink was set. The resultant was placed in an environment of 25° C. and a relative humidity of 55% for 1 hour. Thus, an image for evaluation was obtained. In Examples of the present invention, in evaluation criteria for each of the following items, while levels "A" and "B" were defined as acceptable levels, a level "C" was defined as an unacceptable level. The evaluation results are shown in Table 3.

(Abrasion Resistance)

A friction resistance tester (product name: "AB-301", manufactured by Tester Sangyo Co., Ltd.) that was a friction tester II (Gakushin-type) in conformity with JIS L0849 was used to perform a friction test involving 10 rounds of reciprocating a white cloth (cotton) for friction specified in JIS L0803 on the surface of the recorded image for evaluation at a load of 500 g. The image after the friction test was visually observed, and the abration resistance of the image was evaluated in accordance with the following evaluation criteria. The migration of the ink to the cloth was judged by whether or not the color of the ink adhered to the cloth.

A: None of the migration of the ink to the cloth and the abrasion of the image was observed.

B: The migration of the ink to the cloth was present but no abrasion of the image was observed.

C: Both of the migration of the ink to the cloth and the abrasion of the image were observed.

(Filter Passability Before and After Storage)

200 Grams of the prepared aqueous ink was passed through a filter and the pressure of the ink after the passage was measured with Pressure Transducer PA-850 (Nidec Components Corporation). The above-mentioned aqueous ink was stored at 70° C. for 1 week. After that, 200 g of the ink was passed through the filter again and the pressure of the ink after the passage was measured. A filter made of a SUS mesh having an average pore diameter of 7 μm was used as the filter. The pressures of the ink after the passage before and after the storage were compared to each other. In addition, the filter after the passage of the ink was visually observed and the filter passability of the ink was evaluated in accordance with the following evaluation criteria.

A: No change was observed in pressure measured before and after the storage.

B: A change was observed in pressure measured before and after the storage but no jamming of the filter was observed.

C: A change was observed in pressure measured before and after the storage, and fluid resistance increased and the jamming of the filter was observed after the storage.

TABLE 3

| | | | | | | Evaluation conditions and evaluation results | | | |
| --- | --- | --- | --- | --- | --- | --- | --- | --- | --- |
| | | | | Evaluation condition | | | | Evaluation result | |
| | | Ink storage bag | Direction of gravity | Recording medium | Ink | Dissolved Oxygen content (mg/L) | Filters in flow path | Abrasion registance | Filter passability |
| Example | 1 | 1 | Z | 1 | 1 | 2.0 | Yes | A | A |
| | 2 | 1 | Z | 1 | 2 | 2.0 | Yes | A | A |
| | 3 | 1 | Z | 1 | 3 | 2.0 | Yes | A | A |
| | 4 | 1 | Z | 1 | 4 | 2.0 | Yes | A | A |

TABLE 3-continued

| | | | Evaluation conditions and evaluation results | | | | | |
| | | | | | | | | |

| | | | Evaluation condition | | | | Evaluation result | |
| | Ink | | | | Dissolved Oxygen | | | |
| | storage bag | Direction of gravity | Recording medium | Ink | content (mg/L) | Filters in flow path | Abrasion registance | Filter passability |
|---|---|---|---|---|---|---|---|---|
| 5 | 1 | Z | 1 | 5 | 2.0 | Yes | A | A |
| 6 | 1 | Z | 1 | 6 | 2.0 | Yes | A | A |
| 7 | 1 | Z | 1 | 7 | 2.0 | Yes | A | A |
| 8 | 1 | Z | 1 | 8 | 2.0 | Yes | A | A |
| 9 | 1 | Z | 1 | 9 | 2.0 | Yes | A | A |
| 10 | 1 | Z | 1 | 10 | 2.0 | Yes | A | A |
| 11 | 1 | Z | 1 | 11 | 2.0 | Yes | A | A |
| 12 | 1 | Z | 1 | 12 | 2.0 | Yes | A | A |
| 13 | 1 | Z | 1 | 13 | 2.0 | Yes | A | A |
| 14 | 1 | Z | 1 | 14 | 2.0 | Yes | A | A |
| 15 | 1 | Z | 1 | 15 | 2.0 | Yes | A | A |
| 16 | 1 | Z | 1 | 16 | 2.0 | Yes | A | A |
| 17 | 1 | Z | 1 | 17 | 2.0 | Yes | A | A |
| 18 | 1 | Z | 1 | 18 | 2.0 | Yes | A | A |
| 19 | 1 | Z | 1 | 1 | 1.0 | Yes | A | A |
| 20 | 1 | Z | 1 | 1 | 2.0 | Yes | A | A |
| 21 | 1 | Z | 2 | 1 | 2.0 | Yes | A | A |
| 22 | 1 | Z | 3 | 1 | 2.0 | Yes | A | A |
| 23 | 2 | Z | 1 | 1 | 2.0 | Yes | A | B |
| 24 | 3 | Z | 1 | 1 | 2.0 | Yes | A | B |
| 25 | 1 | Y | 1 | 1 | 2.0 | Yes | A | B |
| 26 | 4 | Z | 1 | 1 | 2.0 | Yes | A | B |
| 27 | 1 | Z | 1 | 1 | 2.0 | No | A | B |
| 28 | 1 | Z | 1 | 19 | 2.0 | Yes | A | B |
| 29 | 1 | Z | 1 | 20 | 2.0 | Yes | A | B |
| 30 | 1 | Z | 1 | 21 | 2.0 | Yes | B | A |
| 31 | 5 | Z | 1 | 22 | 3.0 | No | B | B |
| Comparative 1 | 1 | Z | 1 | 1 | 4.0 | Yes | A | C |
| Example 2 | 1 | Z | 1 | 23 | 2.0 | Yes | C | A |
| 3 | 1 | Z | 1 | 24 | 2.0 | Yes | A | C |

Although the evaluation result of the abrasion resistance of each of Examples 21 and 22 was "A", which was the same as the evaluation result of Example 1, Example 1 was superior to each of Examples 21 and 22.

That is, according to the present invention, the ink jet recording method, which can record an image excellent in abrasion resistance and in which an ink after storage is excellent in filter passability, can be provided. In addition, according to the present invention, the ink jet recording apparatus and the ink storage bag, each of which may be used in the ink jet recording method, can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-167226, filed Oct. 18, 2022, and Japanese Patent Application No. 2023-160080, filed Sep. 25, 2023, which are hereby incorporated by reference herein in their entirety.

What is claimed is:

1. An ink jet recording method comprising ejecting an aqueous ink to a recording medium to record an image with an ink jet recording apparatus comprising:

the aqueous ink;

an ink storage bag configured to store the aqueous ink; and a recording head of an ink jet system configured to eject the aqueous ink, wherein the recording head comprises, in an inside thereof, a filter configured to pass the aqueous ink therethrough, wherein the aqueous ink comprises a pigment, a wax, a dispersant for dispersing the wax, and a resin particle, wherein the aqueous ink has a dissolved oxygen amount of 3.0 mg/L or less, and wherein a total content of the wax and the dispersant for dispersing the wax in the aqueous ink is 0.8% by mass or more to 5.0% by mass or less with respect to a total mass of the ink.

2. The ink jet recording method according to claim 1, wherein the ink storage bag comprises a plurality of layers and comprises a metal layer in a layer configuration thereof.

3. The ink jet recording method according to claim 2, wherein, in the layer configuration of the ink storage bag, a layer that is brought into contact with the aqueous ink is formed of a polyethylene resin.

4. The ink jet recording method according to claim 1, wherein the ink storage bag has a flat shape.

5. The ink jet recording method according to claim 1, wherein the filter configured to pass the aqueous ink therethrough is present in the ink storage bag or in an ink supply flow path from the ink storage bag to the recording head.

6. The ink jet recording method according to claim 1, wherein the dispersant for dispersing the wax comprises a nonionic dispersant and an anionic dispersant.

7. The ink jet recording method according to claim 6, wherein a content of the nonionic dispersant in the aqueous ink is 0.01% by mass or more to 2.5% by mass or less with respect to the total mass of the ink.

8. The ink jet recording method according to claim 6, wherein a content of the anionic dispersant in the aqueous ink is 0.01% by mass or more to 2.5% by mass or less with respect to the total mass of the aqueous ink.

9. The ink jet recording method according to claim 1, wherein the total content of the wax and the dispersant for dispersing the wax in the aqueous ink is 0.10 times or more in terms of mass ratio with respect to a content of the resin particle.

10. The ink jet recording method according to claim 1, wherein the recording medium has a water absorption amount of 10 mL/m$^2$ or less in a Bristow method from start of contact to 30 msec$^{1/2}$.

11. The ink jet recording method according to claim 1, wherein an ink storage amount of the ink storage bag is 100 mL or more to 5,000 mL or less.

12. The ink jet recording method according to claim 1, wherein a pore diameter of the filter is of 1 μm or more to 15 μm or less.

13. The ink jet recording method according to claim 1, wherein the dissolved oxygen amount in the aqueous ink is 1.0 mg/L or more.

14. The ink jet recording method according to claim 1, wherein a resin composing the resin particle comprises at least one resin comprising an acrylic resin and a polyester resin.

15. The ink jet recording method according to claim 1, wherein a content of the pigment in the ink is 0.1% by mass or more to 15.0% by mass or less with respect to the total mass of the aqueous ink.

16. The ink jet recording method according to claim 1, wherein a content of the dispersant in the aqueous ink is 0.01% by mass or more to 5.0% by mass or less with respect to the total mass of the aqueous ink.

17. The ink jet recording method according to claim 1, wherein a content of the resin particle in the aqueous ink is 2.0% by mass or more to 50.0% by mass or less with respect to the total mass of the aqueous ink.

18. The ink jet recording method according to claim 1, wherein a content of the resin particle in the aqueous ink is 2.0% by mass or more to 20.0% by mass or less with respect to the total mass of the aqueous ink.

19. The ink jet recording method according to claim 1, wherein the recording method further includes a step of heating the recording medium having the aqueous ink applied thereto.

20. An ink jet recording apparatus comprising:

an aqueous ink;

an ink storage bag configured to store the aqueous ink; and a recording head of an ink jet system configured to eject the aqueous ink, wherein the recording head comprises, in an inside thereof, a filter configured to pass the aqueous ink therethrough, wherein the aqueous ink comprises a pigment, a wax, a dispersant for dispersing the wax, and a resin particle, wherein the aqueous ink has a dissolved oxygen amount of 3.0 mg/L or less, and wherein a total content of the wax and the dispersant for dispersing the wax in the aqueous ink is 0.8% by mass or more to 5.0% by mass or less with respect to a total mass of the ink.

21. An ink storage bag configured to store an aqueous ink for ink jet, wherein the aqueous ink comprises a pigment, a wax, a dispersant for dispersing the wax, and a resin particle, wherein the aqueous ink has a dissolved oxygen amount of 3.0 mg/L or less, and wherein a total content of the wax and the dispersant for dispersing the wax in the aqueous ink is 0.8% by mass or more to 5.0% by mass or less with respect to a total mass of the ink.

* * * * *